May 17, 1966 W. P. DANNEVIK 3,251,335
VISUAL IRRIGATION PIPE FLOW INDICATOR
Filed Sept. 15, 1964
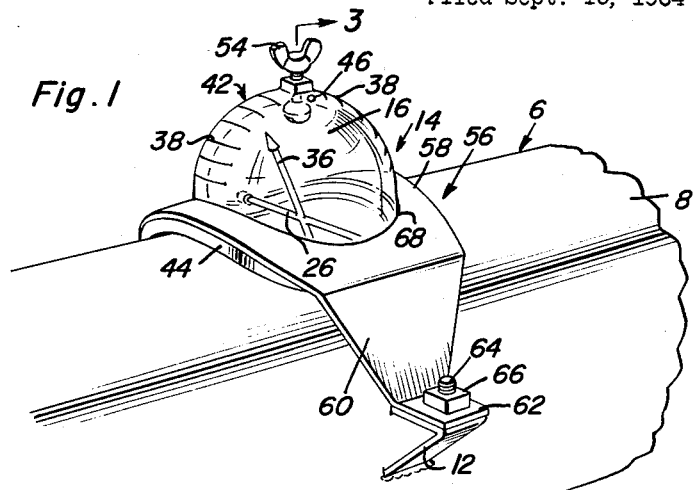
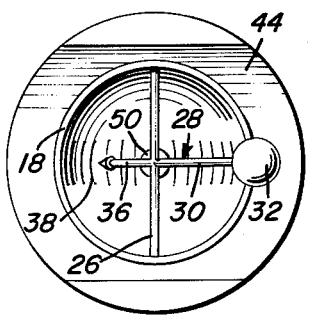
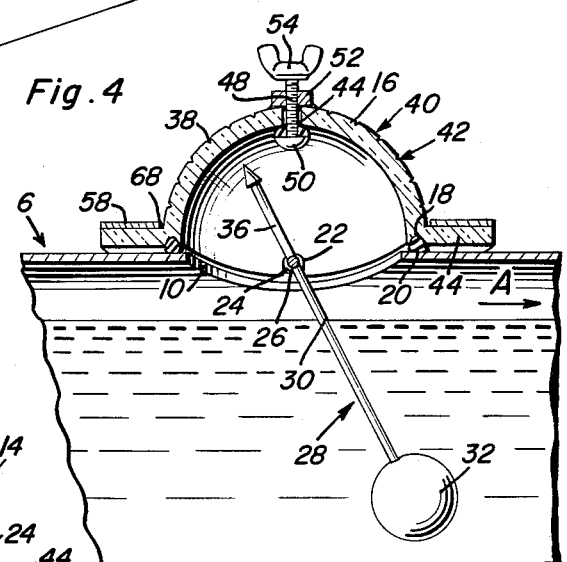
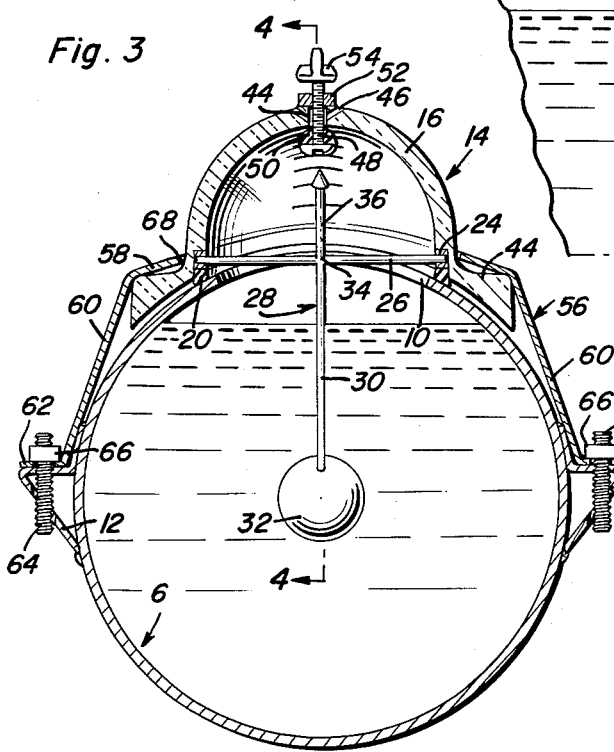
William P. Dannevik
INVENTOR.

United States Patent Office 3,251,335
Patented May 17, 1966

3,251,335
VISUAL IRRIGATION PIPE FLOW INDICATOR
William P. Dannevik, 1008 W. Grant, Dimmitt, Tex.
Filed Sept. 15, 1964, Ser. No. 396,599
6 Claims. (Cl. 116—117)

This invention relates to visual flow indicating means which is functionally designed and structurally adapted for practical and effectual use on and in conjunction with an irrigation well discharge pipe which is connected to an irrigation pipeline and which enables an irrigator to quickly and reliably ascertain whether a given irrigation well is performing properly.

An underground irrigation pipeline often poses problems in that the irrigator cannot see the flow water until it issues from a valve which, as a general rule, is a significant distance from the well and engine operated pump. He cannot readily determine how much, if any, water is being pumped when he starts a well or, for that matter, approaches one that is already in operation. An experienced irrigator resorts to varying steps to determine whether the well is functioning to meet existing demands. For example, he can and often does listen to the engine or resorts to tack-o-meter readings. He may check by feeling the discharge pipe or, alternatively, a close-by standpipe. Then, too, he can and often does attach a suitable faucet to the discharge pipe and, assisted thereby, he can fairly well judge not only when the well starts pumping water but when the irrigation pipeline is full.

Another currently used practice is to install a clear plastic sleeve on a dresser coupling whereby he is then able to tell when the well first starts pumping. By close inspection and observation he can also detect when objectionable air is being pumped.

Expensive measuring equipment embodying fans, propellers, Pitot tubes, pressure gauges and the like not to mention all, are in common usage. Even so and nevertheless, there appears to be no single simple economical adaptation presently available which can be aptly relied upon to acceptably inform an irrigator whether his irrigation well is functioning according to requirements and is not simply pumping air.

Accordingly, it is an objective in the instant invention to solve the problem by using a simple and expedient flow indicator which can be effectively applied to any irrigation water well discharge pipe which is self-contained and not dependent for resultful performance on special valves and hook-ups, or complicated contrivances. With the foregoing in view the present invention serves to quickly indicate—not measure—the flow of water in a low pressure irrigation well discharge pipe. It enables the observer, by visual inspection, to identify the flow in respect to content; namely, air or water or both in proportion to each other, when both are being pumped. It is not complicated and should meet with manufacturing economies of manufacturers and the needs of farmers who are called upon to employ an irrigation well which pumps into a low pressure pipeline or conduit.

As will be hereinafter more fully understood the concept features a visual irrigation flow indicator for the discharge pipe on an irrigation well which enables one to inspect and observe relative velocity of the flow of water, ascertain and check the presence of air in the pipeline and look into the passage of the pipeline, ascertain what the situation is and pursue the steps necessary to remedy it. The invention is inexpensive and can be readily installed merely by cutting a hole in the discharge pipe and taking simple additional steps to attach the visual-type indicator and without of course impairing the discharge pipe.

Briefly, the discharge pipe has a sight opening therein covered by a transparent outstanding inspection dome contoured to conformingly fit in place on the peripheral surface of said pipe. This dome is securely saddled and bracketed in place, is sealed for positive efficiency, is strong and durable, stays put and will last for long serviceable use. The crest of the dome is vented and valved for at will use and a flow sensing device is suspended therefrom and depends into the conduit. This device is equipped with a companion indicator or pointer which cooperates with a suitably graduated tell-tale scale on the dome. It follows that the discharge pipe thus improved well serves the purposes for which it is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a fragmentary portion of the aforementioned irrigation water well discharge pipe, the visual flow indicating means, and how it is constructed and used;

FIGURE 2 is a bottom plan view of the self-contained unit; namely, the dome and flow sensing and flow actuated indicator;

FIGURE 3 is an enlarged view with parts in section and elevation taken approximately on the plane of the vertical section line 3—3 of FIGURE 1;

FIGURE 4 is a fragmentary sectional and elevational view taken on the plane of the section line 4—4 of FIGURE 3; and FIGURE 5 is a fragmentary detail sectional view of a significant portion of the flanged dome.

The present invention can be successfully attached to any irrigation water well discharge pipe. It is a complete unit in itself. It is not dependent on any special valves or specially rigged hook-up. The irrigation water well discharge pipe 6 is fragmentarily shown. The right-hand end portion 8 is mentioned here in that it is to be assumed, as shown by the arrow A in FIG. 4, that the fluid flow is from left to right. With reference to FIGS. 3 and 4 it will be noted that a slight opening 10 of requisite size is cut in the upper peripheral portion of the discharge pipe 6. On diametrically opposite sides substantially V-shaped anchoring brackets 12 are mounted for a purpose to be later described.

The cover means for the sight opening comprises an upstanding readily viewable device, broadly a flow indicator 14. This device is characterized by a transparent substantially semi-spherical dome 16 the bottom portion of which is provided with an endless groove 18 (FIG. 5) for reception and retention of a compressibly resilient O-ring 20 which when in use is seated atop the peripheral surface of the pipe 6 and encompasses the margin of the sight opening 10. At diametrically opposite points pocket-like recesses 22 (FIG. 5) are provided and serve to accommodate bearings 24 for the end portions of a shaft 26 which constitutes a component part of a substantially cruciform indicator 28. This indicator embodies an elongated vertical part 30 which extends downwardly through the hole or sight opening 10 and terminates in a suitable flow actuated and sensing ball or an equivalent element 32. The median portion of the indicator is joined at 34 with a median portion of the shaft 26. The upper end portion 36 projects into the hollow part of the dome and constitutes a pointer. This pointer is cooperable with suitable graduations 38 constituting components of an appropriately calibrated scale. The movement of the flow actuated and sensing indicator means 28 enables the observer or irrigator to ascertain and determine the functioning of the indicator in relation to the relatively stationary dome 40. The scale is denoted as an entity by the numeral 42. It will be observed that the bottom portion of the dome is provided with an outstanding endless flange 44 which is contoured and shaped to conformingly adapt itself to the peripheral surface of the discharge pipe 6.

The upper crown portion of the dome is provided with a vertical hole 44 and communicating diagonal venting orifices 46. This hole serves to accommodate a screw-threaded member 48 having a valve element 50 on its lower end closing the hole 44 and also the vents 46. The upper portion of the screw-threaded member is screwed through a fixed nut 52, said upper portion terminating in an appropriate wing grip 54. The valve is normally closed in the manner illustrated. It is within the purview of the inventive concept to use a valve of the type shown or an equivalent valve such as for example a conventional pneumatic tire valve. The principal thought is in having suitably valved vents for the air space of the dome.

The dome attaching and holddown means comprises a saddle-like metal or equivalent strap 56 which is generally U-shaped in form and has a bight portion 58 and depending limbs 60. These limbs straddle diametrically opposite the sides of the pipe and terminate at their lower ends in outstanding apertured ears 62 which are attached to and bolted in place on the aforementioned brackets 12 by way of bolt and nut means 64 and 66, respectively. The bight portion is saddled over the flange 44 in the manner shown. It is also provided with a central aperture 68 which serves to permit passage of the dome therethrough and to allow the device to be mounted and secured in place in the manner shown. The flanged dome is preferably made of apoxy plastic and is clear and of sufficient strength for use on low pressure irrigation pipelines. The ball 32 may be a steel ball attached to the lower end of the rod 30. The end portions of the shaft 26 are preferably turnable in nylon bushings or bearings 24 in the aforementioned seats 22. The simple device 28 indicates the velocity of the water in the discharge pipe which can be compared by noting the position of the pointer 36 relative to the graduations on the scale means 42. The valve means serves to let air out of the dome. The amount of air that is being pumped can be judged by the rate the water is replaced in the dome. The O-ring constitutes a satisfactory gasket for sealing the dome against the discharge pipe. The groove is thought to be necessary because the dome is subject to negative pressures which would otherwise tend to dislodge the gasket.

The manner in which the device is constructed, applied and operates is thought to be self-evident. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Visual flow indicating means comprising, in combination, an irrigation well discharge pipe having a sight opening therein sufficiently big to allow a sample of the contents of the pipe to flow outwardly through said sight opening and to, in this manner, allow the irrigator to check and inspect the same for air, sand, mud and extraneous matter such as may be indicative of malfunctioning, readily applicable and removable cover means for said sight opening embodying a hemispherical transparent dome functional both as to size and capacity that it can trap and confine a portion of the air, water and contents of the latter outside the surface of said pipe for analysis and inspection, said dome having a readily viewable graduated scale, the open bottom of said dome encircling said sight opening and embodying fluid tight means conformingly contacting coacting exterior surface portions of the pipe encompassing said opening, the crown portion of said dome having at least one venting port and manually controllable valve means normally closing said port, a velocity determining flow sensing and actuated indicator depending through said sight opening into the conduit of said pipe and having a pointer at the upper end thereof projecting into and movable in the hollow portion of said dome and cooperable with the graduations on said scale, means spanning and operably mounting said indicator on the open bottom portion of said dome, and dome mounting and holddown means associatively oriented and cooperable with said dome and saddled over and detachably anchored on said discharge pipe.

2. The structure according to claim 1, and wherein said valve means comprises a valve element on the interior of said dome, said element having a stem extending through an opening provided therefor at the axial portion of the crown portion of said dome, and manually actuable means carried by said stem located exteriorly of said crown portion.

3. The structure defined in claim 2, and wherein said mounting and holddown means comprises a saddle-like strap generally U-shaped in form having a centrally apertured bight portion and terminal limb portions, said dome projecting upwardly through and beyond the aperture, said limb portions straddling the pipe and being secured to anchoring and holddown brackets provided therefor on said pipe.

4. Visual flow indicating means comprising, in combination, an irrigation well discharge pipe having a sight opening therein, said opening being sufficiently large in diameter to allow a sample of the contents of the pipe to flow outwardly through said opening so as to allow the irrigator to check and inspect the same for air, sand, mud and extraneous matter that, to the irrigator, would be indicative of malfunctioning, readily applicable and removable cover means for said sight opening embodying a hemispherical transparent strong plastic dome functional both as to size and capability that it can momentarily trap and confine a portion of the air, water and contents of the latter outside the surface of said pipe for analyzing and inspection requirements, said dome having an outstanding flange at its open bottom shaped residing upon the peripheral surface of said pipe, said flange being contoured to associatively cooperate with said peripheral surface, the bottom portion of said dome having an endless groove at the juncture thereof with said flange, an O-ring seated in said groove and interposed between said surface and bottom portion, a shaft spanning the open bottom portion of said dome and having its end portions journaled in bearings provided therefor in said bottom portion, a vertically elongated indicator joined at right angles to a median portion of said shaft, a lower portion of said indicator depending through said sight opening into said pipe and having a flow sensing and actuatable ball thereon, the upper portion of said indicator projecting upwardly into the hollow portion of said dome and providing a pointer, said dome having a graduated scale and said pointer cooperating with the graduations of said scale, and holddown means for said dome comprising a saddle-like strap generally U-shaped in form having a centrally apertured bight portion and terminal limb portions, said dome projecting upwardly through and beyond the aperture, said limb portions straddling the pipe and being secured to anchoring and holddown brackets provided therefor on said pipe.

5. The structure defined in claim 4, and wherein the crown portion of said dome is provided with vents, and valve means carried by said dome and normally closing said vents.

6. The structure according to claim 5, and wherein said valve means comprises a valve element on the interior of said dome, said element having a stem extending upwardly through and beyond an opening provided therefor in the axial portion of the crown portion of said dome, and manually actuatable means carried by said stem located exteriorly of said crown portion.

References Cited by the Examiner

UNITED STATES PATENTS

| | | | |
|---|---|---|---|
| 1,090,669 | 3/1914 | Woodington et al. | 116—117 X |
| 1,249,484 | 12/1917 | Pogue | 73—228 |
| 2,489,512 | 11/1949 | Auxier | 116—117 |
| 2,580,928 | 1/1952 | Kehm | 116—117 |
| 2,735,300 | 2/1956 | Dungan et al. | 73—228 |
| 2,920,601 | 1/1960 | Turner | 116—118 |
| 3,085,432 | 4/1963 | Bloom et al. | 73—228 |

LOUIS J. CAPOZI, *Primary Examiner.*